May 6, 1958 C. E. LOMAX 2,833,864
TELEPHONE SYSTEM PAYSTATION IDENTIFICATION
Filed Jan. 3, 1955
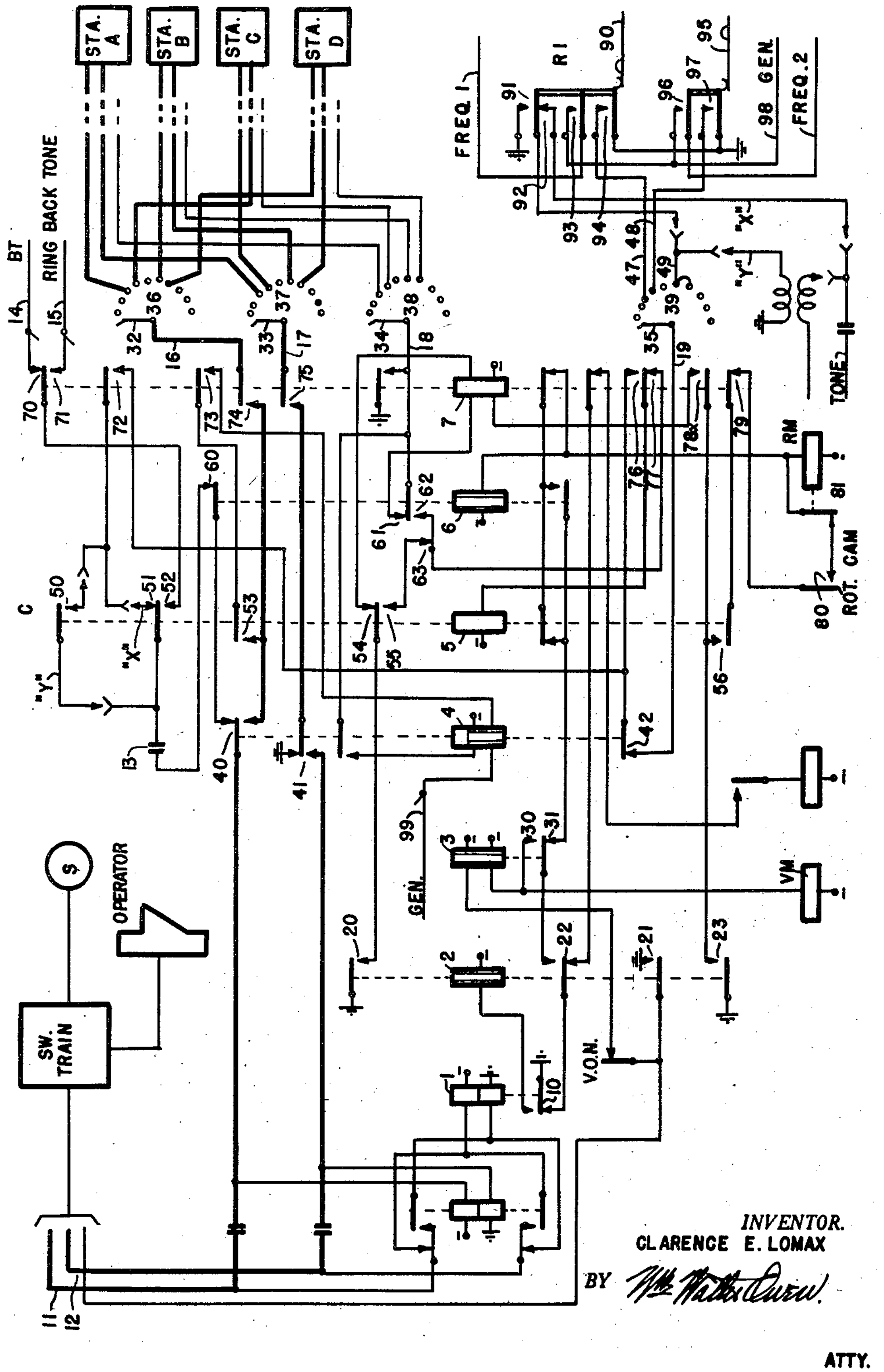
INVENTOR.
CLARENCE E. LOMAX
BY Wm. Walter Ouren
ATTY.

2,833,864
Patented May 6, 1958

2,833,864

TELEPHONE SYSTEM PAYSTATION IDENTIFICATION

Clarence E. Lomax, Chicago, Ill., assignor to General Telephone Laboratories, Incorporated, a corporation of Delaware Application January 3, 1955, Serial No. 479,528

10 Claims. (Cl. 179—18)

The present invention relates generally to telephone systems and more particularly to methods for apprising a calling party or telephone operator of the type of station called.

Identification of a called station as a paystation is essential on collect calls from a toll operator to assure payment of the charge by the called party prior to completion of the connection. The problem of identifying the calling station as a paystation has received extensive treatment in the past, but automatic identification of the called station as a pay station has received little attention. This neglect stems principally from the fact that in the past the numbers assigned to paystations were committed to memory by local operators in exchanges having few paystations, while in large exchanges, such stations were assigned to specific number series which the local operator could recognize, thus obviating the need for automatic identification.

With the advent of nationwide toll dialling many calls will no longer be completed by the local operator, but rather a distant operator will control the connection to the called station. Thus an operator in New York may set up and complete a call to a station in Los Angeles without assistance from a Los Angeles operator. It will be appreciated that recognition of the called paystation by its number becomes increasingly difficult when operator toll dialling is utilized. Either paystation numbers must be standardized throughout the country, or some other method of identifying such stations must be utilized.

This invention provides means for automatic paystation identification, the specific object being the provision of suitable circuit arrangements in a telephone system for identifying the called paystation to the calling party or operator by transmission of a signal to the calling station only when a paystation is called. Use of this invention permits the assignment of paystations to any central office terminal without regard to the particular number of the assigned terminal. Greater flexibility is a resultant as well as a conservation of space and equipment in the central office.

The signal may be a tone or voice message as desired. It is developed through connections in the well-known Strowger step-by-step connector and is transmitted to the calling party during the silent portion of the ringing period. It will be appreciated that the invention may be applied as readily to any of the various telephone systems in use today which employ automatic call distribution and will serve to identify any particular type of service desired.

A feature of this invention is the transmission of a paystation signal to the calling party during the ringing period if a paystation is being rung.

Another feature is the transmission of the paystation signal intermittently between the pulses of ring-back tone.

A further feature is the transmission of the paystation signal to a calling party whether subscriber or operator.

Still another feature is the provision of the paystation signal through a ringing interrupter common to the local telephone exchange.

Yet another feature is the control of transmission of the paystation signal by the connector switch contacting the calling station.

Yet a further feature is the possibility of indiscriminate assignment of paystations to exchange terminals regardless of the types of service offered or the size of the exchange.

Still a further feature of this invention is that it will serve as readily in any group of stations including paystations regardless of the type of service offered by the other stations in the group.

The various features of the invention together with the operation of a telephone system embodying the same will be described in detail hereinafter, reference being had to the accompanying single sheet of drawing. The application shown is by way of example only. In view of the well-known character of the connector switch illustrated, it will be unnecessary to rescribe its circuit in detail, but such mention as seems to be called for will be included along with the explanation of the circuit improvements in which the invention lies.

Referring now to the drawing, there is shown a circuit path from a calling subscribed or operator over lines 11 and 12 to connector C. Seizure of connector C causes relay 1 to operate over the line loop created by such seizure. Relay 1 closes ground to relay 2 through make contacts 10. Relay 2 operates and remains operated throughout the operation of the connector. Relay 2 closes ground to relay 3 through make contacts 21 and off-normal springs, VON.

The calling subscriber or operator, operates the usual calling device in accordance with the telephone number of the called station thereby producing a series of interruptions in the line loop circuit of relay 1. Responsive to these interruptions in its circuit, relay 1 deenergizes momentarily a corresponding number of times and at each deenergization completes a path from ground at the break contacts of armature 10 of relay 1, through the make contacts of armature 22 of slow-to-release relay 2, contacts 30 of relay 3 and the vertical magnet VM to battery. Operation of the vertical magnet VM causes the switch shaft to be raised step-by-step until the wipers 32 to 35 inclusive stand opposite the horizontal level of bank contacts which are terminals of lines leading to a group of telephone stations including the called station. Relay 3 remains held operated during the vertical stepping of the switch, and thereafter it releases and prepares a circuit for the rotary magnet RM by way of contacts 31. Another series of dial pulses causes ground at the break contacts of armature 10 of relay 1 to be connected through the rotary magnet RM and through relay 6 to battery at each deenergization of relay 1. The rotary magnet and relay 6 are energized accordingly and the rotary magnet advances the wipers 32 to 35 inclusive into engagement with successive sets of bank contacts in the level opposite which they are raised and stops the wipers on the set of contacts associated with the called station. The connector C will now test for the presence of ground or battery on the control lead 18 of the called line, ground indicating a busy condition and battery indicating an idle line.

If a busy condition is encountered, busy relay 5 in the connector will operate from ground on the control lead through the switch contact bank 38, wiper 34, over lead 18, through make contacts 62 of slow-to-release relay 6, through break contacts 77 of relay 7 and through busy relay 5 to battery. Relay 6 releases shortly after completion of the rotary stepping and a path for busy tone is extended over conductor 14, through break contacts 70 of relay 7, make contacts 52 of busy relay 5, tone condenser 13, break contacts 60 of relay 6, break contacts of armature 40 of relay 4 and back over line 11 to the telephone of the calling party. Relay 5 is held operated, after relay 6 releases, from ground at make contacts 20 of operated relay 2, through make contacts 55 of relay 5, break contacts 63 of relay 6, break contacts 77 of relay 7 and through the winding of busy relay 5 to battery, thus providing busy tone until the calling party hangs up. The above description follows standard Strowger step-by-step connector operation.

Each station in the called exchange is associated with a contact in the connector extra control (EC) contact bank, such as bank 39 in the drawing. The contact associated with each station has the same position in this bank as the contacts associated with the same station in the line and control banks 36, 37 and 38, respectively. The EC lead 19 has access at wiper 35 to any of the contacts of EC bank 39 which are connected to a ringing interrupter R. I. common to the exchange, over leads such as 47, 48 or 49 depending upon the ringing requirements of each particular station.

The ringing interrupter has a rotating cam, such as 90 and 95, for each ringing frequency desired. If harmonic ringing is employed, several cams will be utilized, with a separate one for each different frequency.

Rotating cam 90 periodically closes contacts 91, 93 and 94 placing ground on leads 47 and 49 and ringing current of frequency 1 on generator lead 98. Upon further rotation of cam 90 contacts 91, 93 and 94 will open removing ground from leads 47 and 49 and ringing current from lead 98. Contacts 92 will close at this point placing the special paystation signal on lead 49. A moment later rotating cam 95 will close its contacts 96 and 97, grounding lead 48 and placing ringing current of frequency 2 on generator lead 98.

Paystations, according to this invention, are associated with lead 49 of the ringing interrupter R. I. which lead, as shown above, is alternately grounded and connected to the paystation signal. When the connector C seizes a paystation line, lead 49 is connected to EC lead 19 of the connector through bank 39. Regular stations such as A and C are associated with other leads of the ringing interrupter R. I., such as 47 and 48, according to the frequency of each station ringer.

Thus the regular stations A and C, may be connected to the third and fourth contacts respectively on the contact bank level shown in the drawing, their line conductors being connected to the third and fourth contacts respectively of banks 36 and 37 and their control conductors to the third and fourth contacts respectively of bank 38. Since these are regular subscriber stations, the third and fourth contacts of bank 38 on the level shown are connected to the leads 47 and 48 respectively of the ringing interrupter so that ringing current of frequency 1 will be transmitted to station A and current of frequency 2 will be transmitted to station C.

Stations B and D, which are represented as paystations, are connected to the sixth and seventh contacts respectively on the level shown of contact banks 36, 37 and 38. The sixth contact at this level of bank 39 is connected to lead 49 of the ringing interrupter R. I. and the seventh contact is multipled to the sixth contact which will result in transmission to the called stations B or D of ringing current of the same frequency as that for regular stations connected to line 47 when either of these stations is called, and in addition the special paystation signal will be transmitted to the calling station.

If the line to station A, B, C or D is idle when encountered by the connector switch, negative battery in the line circuit of the called station will be impressed upon lead 18. When relay 6 releases shortly after the rotary stepping is completed, this negative battery will operate relay 7 through break contacts 61 of relay 6, through the upper winding of relay 7, break contacts 54 of busy relay 5 and make contacts 20 of operated relay 2 to ground. The current flow through the upper winding of relay 7 is sufficient to cause the armature of this relay to close the contacts 78x establishing a locking circuit from battery, through the lower winding of relay 7, through make contacts 78x and through make contacts 23 of operated relay 2 to ground. This connection allows relay 7 to operate fully and close the balance of its contacts. Interrupted ground will be connected to EC lead 19 and interrupted ringing current to the connector generator lead 99 which is connected to generator lead 98 of the ringing interrupter. With relay 7 fully operated, ground on EC lead 19 will cause relay 5 to operate through break contacts 42 of relay 4, make contacts 76 of operated relay 7, through busy relay 5 to battery. Operation of relay 5 closes its contacts 52 and provides a path for ring-back tone from lead 15, through make contacts 71 of operated relay 7, make contacts 52, tone condenser 13, break contacts 60 of relay 6, break contacts 40 of relay 4 and along line conductor 11 to the calling party. In addition, with relays 5 and 7 operated, ringing current is supplied from generator along lead 98 of the ringing interrupter to connector generator lead 99, through ring cut off relay 4, make contacts 73 of relay 7, make contacts 53 of relay 5, make contacts 74 of relay 7, out on line conductor 16, through the called station ringer, back on line conductor 17, through make contacts 75 and break contacts 41 to ground.

It may be noted at this point that busy tone and ring-back tone are furnished over a common path to the calling party's line 11 through a common tone condenser 13, whereas these tones in the standard connector are transmitted to the calling line via separate tone condensers.

When ground is removed from EC lead 19 by further rotation of the ringing interrupter cam, relay 5 will release, and if a regular station such as station A is being called, a silent period between rings will result, and ring-back tone will be removed from the calling line at contacts 52.

If a paystation such as station B is called, a similar operation will occur during the ringing period, but when ground is removed from EC lead 19 by rotation of the ringing interrupter cam 90, contacts 92 will close, and a voice or tone signal will be placed on connector lead 19 via lead 49. This tone is transmitted through break contacts 42 of relay 4, make contacts 72 of relay 7, break contacts 51 of relay 5 (now released), through condenser 13, break contacts 60 and break contacts 40 to the calling party's line 11. Thus between rings the calling party or operator will hear a signal advising them that the called station is a paystation.

The connector switch shown also incorporates means for serving business organizations that use two incoming telephone lines such as the lines to stations C and D, which are assumed to be connected to the ninth and tenth bank positions of the same level, whereby if a call is placed to the business organization and one line is busy, the call will be automatically switched to the second line. The connector switch has a cam thereon which operates cam springs 80 when the connector C has rotated its wipers 32, 33, 34 and 35 to the ninth position of its banks 36, 37, 38 and 39 respectively. If a busy condition is encountered at the called station associated with this bank position, busy relay 5 will operate, as earlier described closing its contacts 56 and causing the rotary magnet RM to operate from ground, through make contacts 23 of operated relay 2, through contacts 56, through the break contacts 79 of relay 7, through the rotary cam springs 80 and through the break contacts 81, through rotary magnet RM to battery and through relay 6 to battery. Operation of rotary magnet RM steps the connector wipers to their tenth bank position. Relay 6 will be held operated, so that if the tenth position is also busy, relay 5 will again operate from ground on the station line circuit control lead and cause busy tone to be transmitted to the calling party.

Stations connected to the ninth and tenth positions may serve as paystations or regular stations with respect to the paystation signalling device, thus illustrating the flexibility of the invention.

The invention is also readily adaptable to provide the paystation signal on toll usage alone, utilizing the same ringing interrupter connections to the connector, in which case the paystation signal is supplied only to a calling toll operator and not to a calling subscriber.

A frequent practice of operators is to dial a line, to listen to see if the line is idle (ring-back tone), or busy (busy tone), and, if the line is idle, to work on the placement of another call until the called party on the first call answers, lighting the operator's answer lamp. The operator may seize the line just as ring-back tone is being transmitted and then close her circuit key before the paystation tone is transmitted thus not recognizing the line as a paystation line. However, it should be appreciated that the usual practice is to ring for one second and to have a four second pause between ringing periods. This practice results in the operator having more chances to hear the paystation tone first on line seizures. If desired, however, the paystation tone may be applied constantly after the line is seized and until the call is answered thus superimposing paystation tone on ring-back tone during the ringing period. This is done by removing break contacts 92 ("*x*" wiring) from the ringing interrupter and applying the paystation tone to lead 49 through a transformer having its secondary winding grounded ("*y*" wiring). Break contacts 51 ("*x*" wiring), are removed and replaced with make contacts 50 ("*y*" wiring). Relay 5 will operate from the transformer ground and remain operated during the ringing period and will close its added make contacts 50. Paystation tone will then be furnished during the entire ringing period including the period when ring-back tone is being furnished.

While the features of this invention have been disclosed with reference to a specific embodiment only, it is understood, of course, that various modifications may be made in the circuit details without departing from the scope of this invention, and it is intended in the appended claims to cover all such modifications as fall within the true spirit and scope of the invention.

What is claimed is:

1. In a telephone system, a calling line, a plurality of called lines certain of which are paystation lines, means for establishing a connection between said calling line and any one of said called lines, a source of ringing current, a source of signalling current, ringing means for applying said ringing current to said connection to ring the called line at intermittent predetermined timed intervals, and additional means in said ringing means effective only in the event that said called line is a paystation line for applying said signalling current to said connection alternately during the intervening times between said predetermined intervals to thereby notify the calling party that said called line is a paystation line.

2. In a telephone system, a calling line, a plurality of called lines certain of which are paystation lines, means including a switch for extending a connection from said calling line to any one of said called lines, a source of ringing current, a source of signalling current, a relay in said switch, means for energizing said relay, ringing means including a ringing interrupter for applying said source of ringing current to said connection under control of said relay to ring any called line at predetermined timed intervals, and additional means alternately controlled by said ringing interrupter effective between said predetermined timed intervals only in the event said called line is a paystation line for transmitting said source of signalling current under control of said relay to said calling line to thereby notify the calling party that said called line is a paystation line.

3. In a telephone system, a calling line, a plurality of called lines certain of which are paystation lines, switching means for extending a talking connection from said calling line to any one of said called lines, a source of ringing current, a source of signalling current, ringing means for intermittently applying said ringing current over said talking connection to ring the called line at predetermined timed intervals, additional means alternately effective between said predetermined timed intervals only in the event that the called line is a paystation line for transmitting said signalling current over said talking connection to said calling line to thereby notify the calling party that said called line is a paystation line, means in said switching means operated responsive to said extended connection being answered for rendering further application of said ringing current and said signalling current ineffective, and means controlled by said last mentioned means for completing said talking connection.

4. In a telephone system, a calling line, a plurality of called lines certain of which are paystation lines, means including an automatic switch for extending a connection from said calling line to any said called line, a source of ringing current, a source of signalling current, a source of ring-back current, means including ringing means for simultaneously applying said ringing current and said ring-back current to said connection at predetermined timed intervals to ring the called line and to notify the calling party that the called line is being rung, and additional means alternately controlled by said ringing means effective between said predetermined timed intervals that said ringing and ring-back currents were applied to said connection and only in the event that the called line is a paystation line for transmitting said signalling current over said connection to said calling line to thereby notify the calling party that said called line is a paystation line.

5. In a telephone system, a calling station, a plurality of called lines certain of which are paystation lines, means including an automatic switch for extending a connection from said calling station to any one of said called lines, a source of ringing current, a source of signalling current, a source of ring-back current, interrupting means, means controlled by said interrupting means responsive to a connection being extended to a paystation line for intermittently connecting said sources of currents to said switch, relay means in said switch operated responsive to said extended connection from said calling station to said paystation line, means controlled by said relay means for applying said ringing current at predetermined timed intervals over said connection to ring said paystation line, other means operated by said relay means for simultaneously applying said ring-back current at the same said timed intervals over said connection to said calling station as an indication to said calling station that said called paystation line is being rung, and additional means also controlled by said relay means for alternately applying said signalling current between said predetermined timed intervals over said connection to said calling station as an indication thereto that said called line is a paystation line.

6. In a telephone system, a calling line, called lines certain of which are paystation lines, means including a switch for extending a connection from said calling line to any one of said called lines, sources of ringing current, each of said sources providing current of a different frequency, a source of signalling current, current interrupting devices connected to said sources of ringing and signalling current, a control lead common to said paystation lines, other control leads individual to the remainder of said called lines, all said control leads being connected to said interrupting devices, means in said switch for connecting said switch to any one of said called lines and simultaneously to a corresponding one of said control leads, means actuated upon connection of said switch to the called line and the corresponding control lead for intermittently transmitting one of said sources of ringing current over said connection to the called line at predetermined timed intervals, and means effective only in the event that said connection of said switch is with a paystation line and said common control lead for intermittently transmitting said source of signalling current over said connection to the calling line alternately between said predetermined intervals that said one source of ringing current is transmitted to the called line.

7. In a telephone system, a calling line, a plurality of called lines certain of which are paystation lines, means including a switch for extending a connection from said calling line to any one of said called lines, sources of ringing current, each of said sources providing current at a different frequency, a source of signalling current, current interrupting devices connected to said sources, means for connecting said switch to any one of said called lines and simultaneously to said devices, and means actuated thereby to intermittently apply ringing current of a particular frequency over said connection to the called line at predetermined timed intervals and means effective only in the event that the called line is a paystation line, for applying said signalling current over said connection to said calling line alternately with the said predetermined timed applications of said ringing current to the called line.

8. In a telephone system, a calling line, a plurality of called lines certain of which are paystation lines, means including a switch for extending a connection from said calling line to any one of said called lines, a source of ringing current, a source of signalling current, a current interrupting device connected to said sources of ringing and signalling current, control leads associated with said called lines, ringing control leads connected to said device, means in said switch for connecting said switch to any one of said called lines and simultaneously to corresponding ones of said control and ringing control leads, means actuated upon connection of said switch to the control lead corresponding to the called line for indicating if said called line is busy, means actuated upon connection of said switch to the ringing control lead corresponding to the called line, only if said called line is not busy, for intermittently applying said ringing current to the called line at predetermined timed intervals, said means effective only in the event that the called line is a paystation line for intermittently applying said signalling current to the calling line during the alternate times between said predetermined timed intervals over said corresponding ringing control lead.

9. In a telephone system, a calling line, called lines certain of which are paystation lines, a connector switch including the usual wipers and bank contact sets associated therewith, means for extending a connection from said calling line to said connector, means for operating said connector to further extend said connection to any one of said called lines by way of the said wipers and associated bank contact sets, an extra control wiper and associated bank contact set included in said connector, a ringing interrupter, a particular conductor extending from said interrupter to said contact bank accessible by said extra control wiper and connected in multiple to all contacts corresponding to said paystation lines, other conductors extending from said interrupter to said contact bank accessible by said extra control wiper and connected to the remaining contacts corresponding to the non-paystation lines, a source of ringing current, a source of ring-back current, a source of special signalling current, means controlled by said ringing interrupter for intermittently extending said ringing current to said connector, relay means in said connector, means controlled by said ringing interrupter over any one of the said conductors extending to said contact bank and in case a connection is extended to any one of said called lines for intermittently operating said relay means, means controlled by said relay means for simultaneously applying the said ringing current to said connection extending to said called line and the said ring-back current to said connection extending to said calling line to respectively ring the called line and inform the calling line that said called line is being rung, means controlled by said ringing interrupter for intermittently extending said special signalling current to said connector by way of said particular conductor only in case the said extended connection is with a said paystation line, and other means controlled by said relay means for applying said special signalling current to said connection extending to said calling line alternately with the application of said ring-back current, whereby said calling line is informed that the said called line is a paystation line.

10. In a telephone system, a called line having a paystation thereon, a connector switch having access to said line, an operator's position, switching equipment controlled from said operator's position for extending a connection to seize said connector switch, means in said connector switch thereafter operated from said operator's position for operating said connector to further extend said connection to said line, means including a test relay in said connector for testing the condition of said line, a switching relay in said connector, means for operating said switching relay in case said line tests idle, means controlled by said switching relay for preparing the signalling circuit to signal said paystation on said line, an alternate circuit for operating said test relay and including a first set of contacts operated by said switching relay, a source of ground potential, a constantly rotating cam, a first set of cam contacts intermittently closed and opened thereby for periodically applying said ground potential to said alternate circuit to periodically operate and restore said test relay, a source of ringing current, a second set of cam contacts intermittently operated by said cam for periodically applynig said ringing current to said signalling circuit at the same time that said test relay is operated, a first set of contacts operated by said test relay for completing said signalling circuit to signal said paystation on said called line, a source of ring-back tone, a ring-back tone circuit extending to said operator's position and including a second set of contacts operated by said operated switching relay, a second set of contacts operated by said test relay for completing said ring-back tone circuit at the same time that said signalling circuit is completed, to inform the operator at said position that the said paystation is being signalled, a source of special tone individual only to a called paystation, a special tone circuit extending to said operator's position and including a third set of contacts operated by said switching relay, a third set of cam contacts operated by said cam at the time that said first set of cam contacts are opened and said test relay is restored for applying said special tone to said special tone circuit, said first and said second sets of contacts being opened by said restored test relay to thereby open said signalling and said ring-back circuits, and a third set of contacts closed by said restored test relay for completing said special tone circuit to inform the operator at said position, during the time that said signalling and ring-back circuits are opened that the said station on said called line is a paystation.

References Cited in the file of this patent

UNITED STATES PATENTS

| | | |
|---|---|---|
| 1,700,469 | Conway | Jan. 29, 1929 |
| 2,367,769 | Goddard | Jan. 23, 1945 |
| 2,700,069 | Pharis et al. | Jan. 18, 1955 |